United States Patent
Antopolsky et al.

(10) Patent No.: US 9,710,660 B2
(45) Date of Patent: Jul. 18, 2017

(54) SYSTEM FOR MEETINGS DOCUMENTATION THAT ENABLES ACCESS TO THE DOCUMENTATION ONLY BY THE CONSENT OF THE PARTICIPANTS

(71) Applicants: Eliahu Antopolsky, Zichron Yakov (IL); Yacov Gottman, Karkur (IL)

(72) Inventors: Eliahu Antopolsky, Zichron Yakov (IL); Yacov Gottman, Karkur (IL)

( * ) Notice: Subject to any disclaimer, the term of this patent is extended or adjusted under 35 U.S.C. 154(b) by 0 days.

(21) Appl. No.: 14/440,356

(22) PCT Filed: Nov. 18, 2013

(86) PCT No.: PCT/IL2013/000083
§ 371 (c)(1),
(2) Date: May 3, 2015

(87) PCT Pub. No.: WO2014/080393
PCT Pub. Date: May 30, 2014

(65) Prior Publication Data
US 2015/0302212 A1 Oct. 22, 2015

(30) Foreign Application Priority Data
Nov. 25, 2012 (IL) .......................................... 223225

(51) Int. Cl.
*G06F 21/60* (2013.01)
*G06Q 10/10* (2012.01)
*G07C 9/00* (2006.01)

(52) U.S. Cl.
CPC ........... *G06F 21/604* (2013.01); *G06Q 10/10* (2013.01); *G07C 9/00* (2013.01)

(58) Field of Classification Search
CPC .............................. G06F 21/604; G06Q 10/10
(Continued)

(56) References Cited

U.S. PATENT DOCUMENTS 3,740,759 A * 6/1973 McKeegan .............. G07C 1/14
235/458
3,790,957 A * 2/1974 Dukes ................ G06Q 20/4037
340/5.6
(Continued)

FOREIGN PATENT DOCUMENTS

WO WO2004067885 A1 8/2004
WO WO2008136031 A1 11/2008

OTHER PUBLICATIONS www.gadgnet.co.il/security-spy-gadgets/mini-dvr.html.
www.yosonic.co.il/securitycamera.html.

*Primary Examiner* — Matthew Henning
(74) *Attorney, Agent, or Firm* — B. Aaron Schulman, Esq.; Stites & Harbison, PLLC

(57) ABSTRACT

A system for audio and visual documenting of personal meetings between two or more persons whereby the documentation is stored in a memory means where the access to the memory means can be done only by consent of said participants and by a positive action made by each of them. The system includes a casing, a memory means, a recording voice means or a video recording means, a locking means and authorized keys. The memory means is saved in the casing and locked by the locking means. Opening the locking means and the casing can be done only by using authorized keys. The locking means is a locking means selected from the group consisting of a mechanical locking, an electronic lock, an electric lock, a lock based on magnetic cards, a biometric lock, a locking means based on finger print, retina or DNA sample.

3 Claims, 1 Drawing Sheet

(58) Field of Classification Search
USPC .......................................................... 726/27
See application file for complete search history.

(56) References Cited

U.S. PATENT DOCUMENTS

| | | | | |
|---|---|---|---|---|
| 3,913,136 | A * | 10/1975 | Kelch | G11B 15/675 242/358 |
| 4,131,001 | A * | 12/1978 | Gotto | E05B 73/0023 70/14 |
| 5,111,289 | A * | 5/1992 | Lucas | G08G 1/0175 348/148 |
| 5,402,167 | A * | 3/1995 | Einbinder | H04N 5/77 348/143 |
| 6,831,795 | B1 * | 12/2004 | Burns | G11B 5/78 360/15 |
| 7,938,863 | B2 * | 5/2011 | Skinner | G06F 21/31 206/307 |
| 2002/0023853 | A1 * | 2/2002 | Lax | B65D 50/067 206/310 |
| 2002/0029350 | A1 * | 3/2002 | Cooper | G06Q 10/10 726/26 |
| 2002/0157227 | A1 | 10/2002 | Hedrick | |
| 2003/0234772 | A1 * | 12/2003 | Zhang | G06F 17/30843 345/177 |
| 2004/0263636 | A1 * | 12/2004 | Cutler | H04N 7/15 348/211.12 |
| 2004/0267387 | A1 * | 12/2004 | Samadani | G11B 27/034 700/94 |
| 2005/0050344 | A1 * | 3/2005 | Hull | G06F 21/602 713/193 |
| 2005/0100329 | A1 * | 5/2005 | Lao | G08B 13/19647 386/216 |
| 2006/0161435 | A1 * | 7/2006 | Atef | G06F 21/31 704/246 |
| 2007/0080826 | A1 * | 4/2007 | Chang | B60R 11/02 340/937 |
| 2007/0106892 | A1 * | 5/2007 | Engberg | G06Q 20/02 713/168 |
| 2008/0068787 | A1 * | 3/2008 | Okada | G03G 15/5016 361/679.43 |
| 2010/0030738 | A1 * | 2/2010 | Geer | G06F 17/30026 707/760 |
| 2013/0097689 | A1 * | 4/2013 | Villoria | H04L 63/102 726/9 |
| 2013/0156194 | A1 * | 6/2013 | Tanioka | G06F 21/32 380/277 |
| 2013/0230294 | A1 * | 9/2013 | Sassa | H04N 5/2354 386/224 |

* cited by examiner

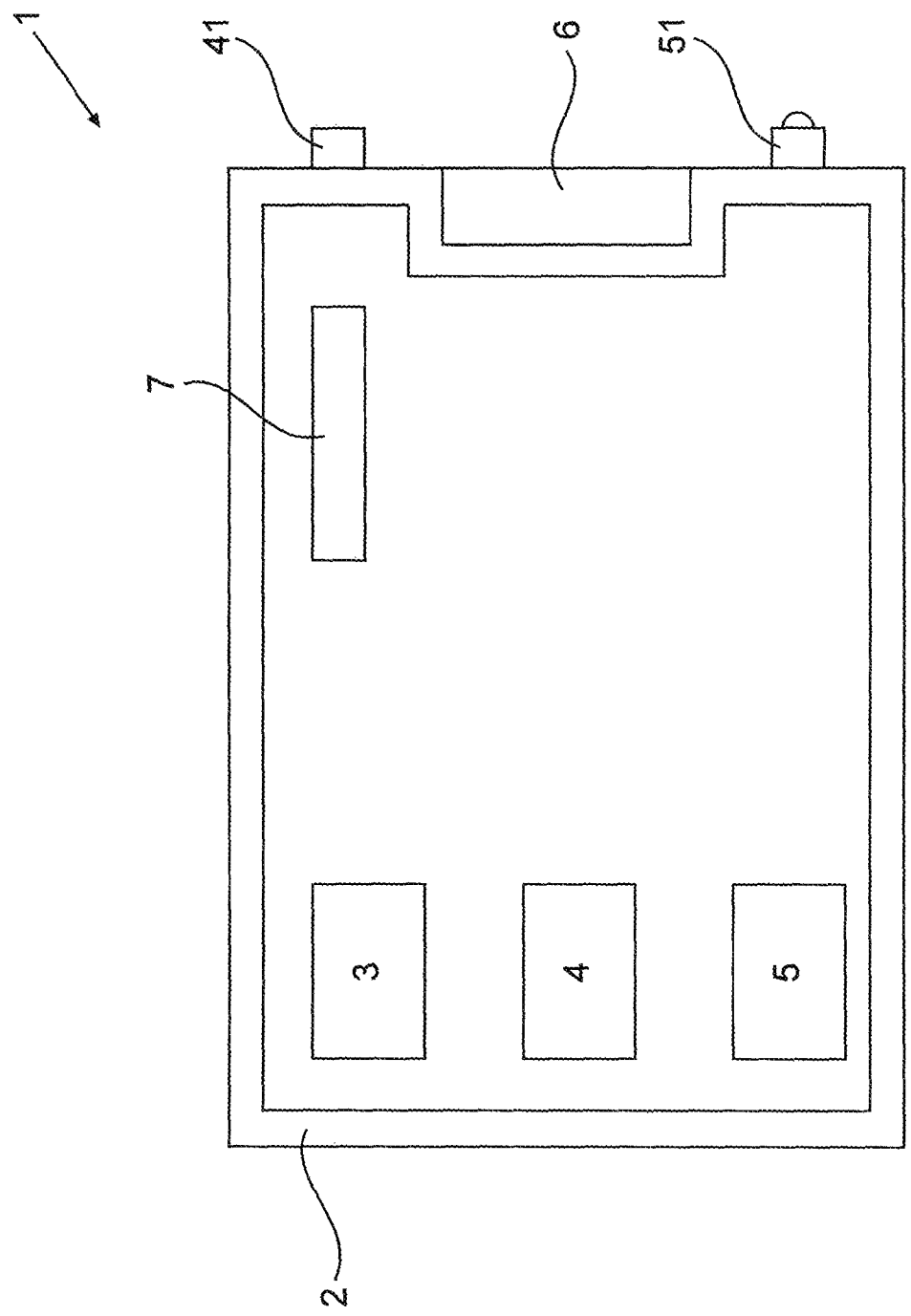

SYSTEM FOR MEETINGS DOCUMENTATION THAT ENABLES ACCESS TO THE DOCUMENTATION ONLY BY THE CONSENT OF THE PARTICIPANTS

RELATED APPLICATIONS

This application is a National Phase of PCT Patent Application No. PCT/IL2013/000084 having International filing date of 18 Nov. 2013, which claims the benefit of priority of IL Patent Application. No. 223225 filed on 25 Nov. 2012. The contents of the above applications are all incorporated by reference as if fully set forth herein in their entirety.

FIELD OF THE INVENTION

The present invention relates to a system for meetings documentation which enables an access to the documentation only by the consent of the participants

BACKGROUND OF THE INVENTION

In many cases disputes arise as to the nature and the content of meetings that was held in the past, mainly when such meetings were not recorded and were between two persons in private. Experience of life teaches us that in many such cases one participant alleges ex post facto that during the meeting certain events happened or certain spoken words were told and on the other hand the other participant alleged differently. Systems for meeting documentation which include audio and video recording are known in the art and can provide satisfied solution in a wide range of cases.

However, the solution as described above is not sufficient in special cases, when the participants have interests to record the meeting and in the same time they are also interested in the safety of documentation, in the meaning that no one—even one of the participant—would have an access to the documentation without specific consent of all the participant of that meeting. Such kind of meeting can be for example: meetings between psychologist or psychiatric and patient.

In such meetings the patient discloses personal and intimate information that he does not want this information would be disclosed to others; meetings between attorney and his client when they discuss sensitive matters; meetings for medical treatment such as dental, physiotherapy and other kinds of medical treatment; Sexual meetings between two persons where the position of authority at work exists between them, and other kind of relationship, where there is a concern that in the future one participant may claim that he had sex without consent or that the nature of the relationship was colored with semi criminal or immoral aspects. The expression "personal meeting" or "face to face personal meeting" in this patent application relates to all of those kind of meetings, which express meetings in which the participants are together in the same place and time.

The Gadget-NET website (gadgnet.co.il) presents a very simple sound and video recording device that includes a miniature camera and miniature recording device that are intended for security monitoring and documentation of meetings, although the device is designed mainly for covert recording and filming. The sound and video recordings are saved on a memory card and when the recording ends, they may be viewed and listened to. The said recording device is not, however, equipped with any components that prevent unauthorized access of the participants to the documentation.

The Yosonic website (yosonic.co.il) also offers a security camera of the kind that is customarily installed in entrances to structures such as residential building and businesses. The camera documents every event within its photographic range and the recording is saved on a memory card. In the event of a criminal or felonious event, such as robbery, burglary, theft, and so on, the video film enables to identify the perpetrators. In order to prevent the perpetrators from breaking open the camera and destroying the recording documenting their criminal or felonious act, it is customary to install such cameras in high and inaccessible locations and to cache them within a safety casing. Here too, the said recording device is not equipped with any components that prevent unauthorized access of the participants to the documentation.

Patent Application WO2004067885 (A1) describes a lock with a double locking device: mechanical and electronic. The said lock may be opened using a single key and it is designed for use on doors, mailboxes, safes, and so on. The key, which is used to physically open the mechanical lock, also includes an electronic code that opens the electronic lock. It is obvious that any person who is in possession of the key can open the lock regardless of the agreement or cooperation of any other person.

The three above-mentioned publications refer to three different devices, whose manner of assembly differs from that of the system, subject of the present invention, and that are intended for different purposes and are designed to solve different problems than those addressed by the present system. The system, subject of the present invention, is designed to document personal meetings and to save the said documentation in a manner that enable assess to it only upon authorization and positive action of the participants in the said meeting. The system includes a locking device and two or more authorization keys, locking device may be unlocked and the system's casing may be opened, thus exposing the documentation saved in the system's memory devices, only if and when all of the said authorization keys are used.

The present invention offers a solution for people who wish to document a personal meeting in a way that will prevent any access the documentation unless such access is authorized by all of the meeting's participants and by the positive action of each and every one of the participants. The system includes several authorization keys such that access to the documentation is granted only when all of the keys are used at once. Thus, for instance, the system may be used by a psychologist and his patient, or by a lawyer and her client, or by a pair of lovers who wish to document their meeting but do not want the other to be able to access the information in the future without both participants consenting to such access. The system, subject of the present patent application, offers an excellent solution to this problem.

LIST OF DRAWINGS

The intention of the drawings attached to the application is not to limit the scope of the invention and its application. The drawings are intended only to illustrate the invention and they constitute only one of its many possible implementations.

FIG. 1 described schematically the system (1) the includes casing (2), memory means (3), recording voice means (4) with a microphone (41), video recording means (5) with a camera (51), locking means (6) and self destruction means (7).

THE INVENTION

The main object of the present invention is to provide a system that is aimed to record meetings between two persons or more by video and audio means. Additional object of the present invention is to provide such system whereby the documentation is stored in a memory means that is itself saved in a casing like a safe. An additional object is to provide such system whereby it is possible to open the safe casing where the memory means is saved only by two different keys, which each of them is possessed by each of the participant of the meeting.

The system (1) subject of the present invention includes casing (2), memory means (3), recording voice means (hereinafter "RVM") (4) with a microphone (41), video recording means (hereinafter "VRM") (5) with a camera (51), locking means (6) and self destruction means (7).

The RVM (4) includes a microphone (41) and it can be any kind of a standard recording voice means which enables voice recording and storing this recording in a memory means (3). The VRM (5) includes a camera (51) and it can be any kind of a standard video recording means which enables video recording and storing this recording in a memory means (3).

The memory means (3) is located inside the casing (2) and it can be any kind of a microprocessor or any kind of storing means that are known in which the documentations of the personal meeting are stored. The structure of the RVM (4), the VRM (5), the memory means (3) and the way they are connected to each other are known and understandable to any average expert in the field and therefore there is no need for further details. The system (1) also includes an internal power source or connection to an electrical network.

The casing (2) of the system (1) is the main innovative element of it. The casing (2) is used as a safe and contains the memory means (3) where the documentation of personal meetings are stored. The memory means (3) can only received the transmissions from the RVM (4) and VRM (5) and this transmission are stored in it. However, it is not possible to draw out the documentation from the memory means (3) but only after opening the casing (2) and connecting to the memory means (3). Connecting to the memory means (3) for drawing out the documentation can be done by any kind of connection means for example USB connection.

The casing (2) is locked by the lock means (6) which can be opened only by using two different keys (hereinafter "authorized keys"). It is also possible to implement the invention by using three authorized keys or more. However it seems that the practical use of the system is for documentation of meeting held by two persons only, where disputes regarding the meeting may arise.

Opening the casing (2) and access to the documentation can be done only by the consent of all the parties of the meeting and only after they use their authorized keys that they keep. Each participant of the personal meeting receives one authorized key and without this key it is impossible to open the casing (2). Thus each participant of the personal meeting knows that there is no risk to document the personal meetings due to the fact that the documentation is inaccessible to any person without his or her consent and without using the authorized key that he obtains.

The casing (2) as described above can be designed as a metal case that is hard to be broken as a safe for example.

In addition, the authorized keys are described above as keys for a safe. Nonetheless, the casing (2) can be any kind of means in which it is possible to store information and it can be also virtual means and accordingly the authorized keys can be a virtual keys such as a code.

The way of using the system (1): anyone who plans to have a personal meeting, or series of such meetings, can purchase the system (1) and can use it for documenting those meetings. Any participant gets an authorized key, and therefore only the participants together and with their own consent can open the casing (2) and reveal the information in the memory means (3). One of the participants can keep the casing (2), however, this participant cannot open the casing and reveal the information.

The system (1) can include a self destruction means (SDM) (7) whereby any attempt to open the casing (2) without the authorized keys will lead to extermination or the memory means (3) and the information. Thus, each participant can be sure that the information will not leak without his action and permission.

If after the meeting one of the participants alleged that during the meeting something wrong had happened, or in any other case of disagreeing as to the nature of the meeting, the participants can together open the casing (2), reveal the information and by that to resolve the dispute. It is clearly understood that if the keeper of the casing (2) destroyed or lost it then this fact would be held against him in any legal or other proceedings.

Any unit of the system (1) can be used to document one or series of personal meetings between the same participants. For example, a psychologist can buy several units of the system (1) and each of them may be used for documenting the personal meetings with a specific patient. Also, any couple that has intimate meetings, especially meeting with explosive potential, can purchase a unit of the system (1) for documenting their meetings, for any dispute that may arises. The system (1) provides a cheap and efficient solution for documenting such personal meetings.

FIG. 1 describes schematically the system (1) that includes a casing (2), a memory means (3), RVM (4) with a microphone (41), VRM (5) with a camera (51), locking means (6) and SDM (7).

The second embodiment of the system (1) includes a master key that can be used for opening the casing (2) and revealing the information even with no need of using the authorized keys. The participants suppose to deposit the master key in the hands of trustee. The trustee may use the master key only in accordance with judicial decree of component court. This is for excluding the possibility of a participant to hide his key and by that to prevent the opening of the casing (2) in special circumstances.

Another embodiment of the system (1) relates to an IPhone application that enables using the camera and the microphone of the IPhone for documenting a personal meeting after inserting two personal codes. It is possible to reveal the information from the files only after inserting these codes. The using of the application can be as follows: (a) activating the IPhone application; (b) any participant inserts a private code that he may choose by his discretion. It goes without saying that each participant should keep his own private code in confidence; (c) the participants activate the camera and the microphone of the IPhone and these recordings saved as digital files; (d) it is possible to open these files and to watch and listen to the information in these files only after all the participants insert their own private codes.

Another embodiment of the system (1) relates to a system (1) whereby it is possible to open the locking means (6) by a single authorized key. In this way, one participant can keep the casing (2) and only one participant holds the authorized key and this participant has a full and total control regarding the opening of the casing (2) and revealing the information. In case of therapist and patient relations, the patient may prefer to keep the authorized key.

The locking means (6) that is described and mentioned above relates to variety of locking means known in the field including mechanical locking, an electronic locking, an electric lock, a lock based on magnetic cards, biometric lock, a locking means based on finger print and a locking means based on retina lock or locking means based on DNA sample. In addition, the users are not required to insert their relevant data for the locking, such as their finger prints, their retina scanning or their DNA sample anytime they use the system (1) but only in the first time of using it.

The invention claimed is:

1. A system for audio or visual documenting of face to face personal meetings between two or more participants comprising:
    a casing, a memory means, a recording voice means with a microphone and a video recording means with a camera, a locking means, a master key, and two or more authorized keys;
    wherein said memory means is saved in said casing; wherein said casing is locked by said locking means; and wherein audio or visual documentation of said face to face personal meeting is stored in said memory means saved in said casing;
    whereby each of said participants of said face to face personal meeting possesses an authorized key which is different than the other authorized keys;
    wherein access to the casing in which said memory means is saved can be provided only by unlocking said casing using all of said different authorized keys or by using said master key;
    wherein said locking means is a locking means selected from the group consisting of an electronic lock, an electric lock, a lock based on magnetic cards, a biometric lock, a locking means based on finger print, a locking means based on retina lock, and locking means based on DNA sample; and
    whereby access to said documentation in said memory means saved in said casing can be done only by consent of all of said participants of said face to face personal meeting by using all of their authorized keys or by using said master key; and whereby each participant of said face to face personal meeting is aware of the fact that said documentation is inaccessible to any person without his or her consent and without using his or her specific authorized key or by using said master key.

2. A system for audio or visual documenting of face to face personal meetings between two or more participants comprising:
    a casing, a memory means, a recording voice means with a microphone and a video recording means with a camera, a locking means, and two or more authorized keys;
    wherein said memory means is saved in said casing; wherein said casing is locked by said locking means; and wherein audio or visual documentation of said face to face personal meeting is stored in said memory means saved in said casing;
    whereby each of said participants of said face to face personal meeting possesses an authorized key which is different than the other authorized keys;
    wherein access to the casing in which said memory means is saved can be provided only by unlocking said casing using all of said different authorized keys;
    wherein said locking means is a locking means selected from the group consisting of an electronic lock, an electric lock, a lock based on magnetic cards, a biometric lock, a locking means based on finger print, a locking means based on retina lock, and locking means based on DNA sample; and
    whereby access to said documentation in said memory means saved in said casing can be done only by consent of all of said participants of said face to face personal meeting by using all of their authorized keys; and whereby each participant of said face to face personal meeting is aware of the fact that said documentation is inaccessible to any person without his or her consent and without using his or her specific authorized key.

3. The system according to claim 2 further comprising a self-destruction means whereby any attempt to open said casing without said authorized keys will result in the extermination of said documentation in said memory means.

* * * * *